Figure 2:
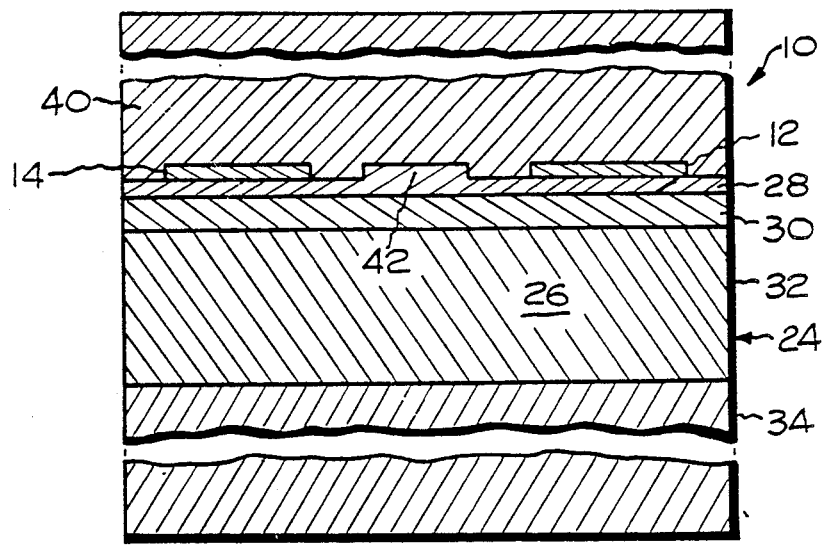

United States Patent [19]

Mourou et al.

[11] Patent Number: 4,928,076
[45] Date of Patent: May 22, 1990

[54] ULTRAFAST OPTICAL MODULATOR

[75] Inventors: Gerard A. Mourou; John A. Nees, both of Rochester; Steven L. Williamson, Henrietta, all of N.Y.

[73] Assignee: The University of Rochester, Rochester, N.Y.

[21] Appl. No.: 425,457

[22] Filed: Oct. 23, 1989

Related U.S. Application Data

[63] Continuation of Ser. No. 242,247, Sep. 9, 1988, abandoned.

[51] Int. Cl.⁵ .................................................. G02B 6/10
[52] U.S. Cl. .................................... 330/4.3; 350/96.14
[58] Field of Search ...................... 352/7.51; 350/96.14

[56] References Cited

U.S. PATENT DOCUMENTS 4,005,927  2/1977  Caton ................................ 350/96.14
4,706,103  11/1987  Ranganath .................. 350/96.14 X
4,767,169  8/1988  Teng et al. ......................... 350/96.14

OTHER PUBLICATIONS

M. Izutsu, Y. Yamane, and T. Sueta, *IEEE J. Quant, Electron,* QE-13, 287 (1977).
K. Kubota, J. Noda, and O. Mikami, *IEEE J. Quant, Electron,* QE-16, 754 (1980).
F. J. Leonberger, *Opt. Lett.* 5, 312 (1980).
C. M. Gee, G. D. Thurmond, and H. N. Yen, *Appl. Phys. Lett.* 43, 998 (1983).
P. Buchman, H. Kaufmann, H. Melchoir, and G. Guekos, *Appl. Phys. Lett.* 46, 462 (1985).
D. M. Materna, Case Western Reserve University, Department of Electrical Engineering and Applied Physics, M. S. Thesis (1986).
J. F. Whitaker, T. B. Norris, G. Mourou and T. Y. Hsiang, *IEEE Trans. Microwave Theory Tech.* MTT-35, 41 (1987).
J. F. Whitaker, R. Sobolewski, D. R. Dykaar, T. Y. Hsiang, and G. A. Mourou, *IEEE Trans. Microwave Theory Tech.* MTT-36, 277 (1988).
I. P. Kaminov, *An Introduction to Electro-Optic Devices,* (Academic Press, New York, 1974).
E. Yamashita, K. Atsuki, and T. Ueda, *IEEE Trans. Microwave Theory Techn.* MTT-27, 1036 (1979).

*Primary Examiner*—Thomas H. Tarcza
*Assistant Examiner*—Mark Hellner
*Attorney, Agent, or Firm*—Martin Lukacher

[57] ABSTRACT

An ultrafast traveling wave optical modulator capable of functioning at frequencies greater than 100 GHz having an optical waveguide parallel to a transmission line. The optical waveguide is in a substrate of electro-optic material (GaAs with GaAlAs layers forming the optical waveguide). The transmission line is a pair of coplanar electrodes on the substrate. A superstrate having an effective dielectric constant substantially equal to the square of the index of refraction of the substrate (a GaAs body in which the electric field on the line is substantially confined) eliminates the mismatch in velocity of propagation of the traveling electrical and optical signals thereby increasing the response time of the modulator so that it can function when the electrical modulating signal on the line exceeds 100 GHz in bandwidth.

12 Claims, 1 Drawing Sheet

ULTRAFAST OPTICAL MODULATOR

This invention was made with Government support under F49620-87-C-0016 awrded by the Air Force. The Government has certain rights in this invention.

This is a continuation of Application Ser. No. 242,247, filed Sept. 9, 1988, now abandoned.

The present invention relates to optical modulators in which an optical signal is modulated by an electrical modulating signal, and particularly to traveling wave optical modulators wherein a transmission line along which the electrical signal propagates is paralleled by an optical waveguide of electro-optic material in which the optical signal propagates.

The invention is especially suitable for providing ultrafast optical modulators which can function at frequencies above 100 GHz so as to modulate optical signals with electrical signals having ultrashort rise and/or fall times, which may be in the picosecond range, such signals having bandwidths greater than 100 GHz.

Traveling wave optical modulators of various designs have been proposed including those having optical waveguides of electro-optic material parallelling traveling wave transmission lines. The electric field due to the traveling wave interacts with the waveguide which is of electro-optic material, causing changes in its index of refraction and therefore in the polarization of the optical signal which corresponds to the electrical signal, thereby modulating the optical signal. Reference may be had to the publications listed below for further information, respecting such optical modulators.

1. M. Izutsu, Y. Yamane, and T. Seuta, *IEEE J. Quant, Electron, QE*-13, 287 (1977).
2. K. Kubota, J. Noda, and O. Mikami, IEEE J. Quant, Electron, QE-16, 754 (1980).
3. F. J. Leonberger, Opt. Lett. 5, 312 (1980).
4. C. M. Gee, G.C. Thurmond, and H. N. Yen, Appl. Phys. Lett. 43, 998 (1983).
5. P. Buchman, H. Kaufmann, H. Melchoir, and G. Guekos, Appl. Phys. Lett. 46, 462 (1985).
6. D. M. Materna, Case Western Reserve University, Department of Electrical Engineering and Applied Physics, M. S. Thesis (1986).
7. J. F. Whitaker, T. B. Norris, G. Mourou and T. Y. Hsiang, IEEE Trans. Microwave Theory Tech MTT-35, 41 (1987).
8. J. F. Whitaker, R. Sobolewski, D. R. Dykaar, T. Y. Hsiang, and G. A. Mourou, IEEE Trans. Microwave Theory Tech. MTT-36, 277 (1988).
9. I. P. Kaminov, An Introduction to Electro-Optic Devices, (Academic Press, New York, 1974), p. 228.
10. E. Yamashita, K. Atsuki, and T. Ueda, IEEE Trans. Microwave Theory Techn. MTT-27, 1036 (1979).

The modulator bandwidth of a traveling wave optical modulator is determined by the dispersive properties of the transmission line due to modal dispersion (also known as the establishment of higher order modes on the line) (see reference 7 which is listed above) skin effect loses (see reference 8 listed above) and velocity mismatch between the velocity of the traveling electrical and optical signals as waves (see reference 10 listed above). The time response of a traveling wave modulator is limited by the velocity mismatch to a bandwidth of approximately 20GHz (see reference 10). It has been discovered in accordance with the invention, that a significant enhancement in band width, which has been demonstrated to achieve a bandwidth greater than 100GHz, may be achieved by elimination of the velocity mismatch through the use of a body of dielectric material around the transmission line which enables the line to have an effective dielectrical constant, the square root of which is substantially equal to the index of refraction of a substrate on which the electrodes providing the line are located.

In a preferred embodiment of the invention when the substrate is a body of galium arsnide (GaAs) a GaAs superstrate (a body of GaAs material) disposed in contact with the optical waveguide in the substrate and parallelling the transmission line substantially eliminates the velocity mismatch and provides the ultrafast response and broad band operation of the modulator.

The velocity of the electrical signal is proportional to the ratio of the speed of light to the square root of the dielectric constant in the vicinity of the transmission line. The velocity of the optical signal is proportional to the ratio of the wavelength of light to the index of refraction of the material in which the signal propagates. In the case of a coplanar transmission line on a substrate with a superstrate in contact with the line on the opposite side of the line from the substrate, the cut off frequency $v_c$ of the surface wave in the $TE_1$ mode is $$v_c \sim \frac{c}{4d \sqrt{\epsilon_{sub} - \epsilon_{sup}}}$$

where c is the speed of light, d is the effective electrode separation of the electrodes of the line and $\epsilon_{sub}$ is the dielectric constant of the substrate material and $\epsilon_{sup}$ is the dielectric constant of the superstrate material.

When the superstrate and substrate have essentially the same dielectric constant, the cut off frequency increases.

The increase is equivalent to eliminating the velocity mismatch between the optical and electrical signals. This mismatch limits the rise time $\tau_r$ of the modulator to a value $$\tau_r = \Delta n \cdot \frac{l}{c}$$

where $\Delta n = \sqrt{\epsilon_{eff}}-$ and n is the substrate index of refraction. Accordingly, by using a body of material, the dielectric constant of which is substantially equal to the square of the index of refraction of the substrate, the condition, $\epsilon_{eff} - n^2$, the effect of velocity mismatch can be substantially eliminated, thereby increasing the response time and bandwidth of the modulator.

The effects of modal dispersion on bandwidth are reduced in accordance with the invention by providing a rib in the substrate between the electrodes to retain the dielectric constant uniform about the electrodes and to guide the optical wave by confining its field laterally (in the direction between the electrodes). Skin effect losses may also be reduced by utilizing superconducting electrodes, preferably those having a large energy gap, of the order of hundreds of GHz and operating the modulator at or below the critical temperature. For example, a superconductor such as Nb with a critical temperature $T_c=9°$ K. has an energy gap corresponding to 700 GHz.

Accordingly it is the principal object of the present invention to provide an improved optical modulator.

It is a more specific object of the invention to provide an improved optical modulator wherein a traveling wave electrical signal provides a field which interacts with an optical signal traveling parallel to the electrical signal in an optical waveguide.

It is a still further object of the present invention to provide a traveling wave optical modulator which has a bandwidth capability greater than 100 GHz.

Figure 1:
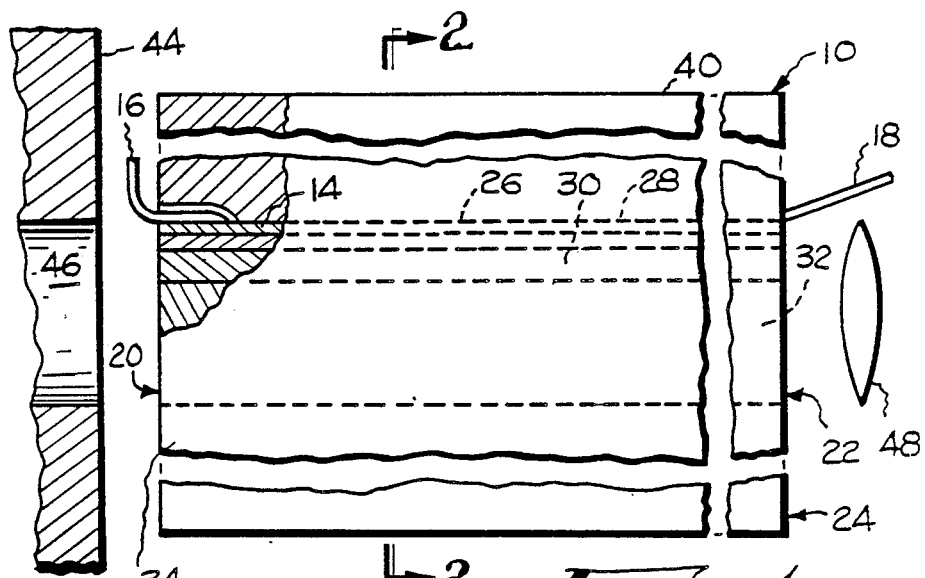

The foregoing and other objects, features and advantages of the invention will be more apparent from a reading of the following description in connection with the accompanying drawings in which:

FIG. 1 is a view in elevation of a traveling wave optical modulator embodying the invention which is partially broken away to show the connection of the electrical modulating signal to one of the electrodes of the transmission line of the modulator and also showing optics of launching and collecting the optical signal which travels along an optical waveguide in the modulator; and FIG. 2 is a sectional view of the modulator shown in FIG. 1, the section being taken along the line 2—2 in FIG. 1.

Referring to the drawings, there is shown an ultrafast traveling wave optical modulator 10. The modulator is a solid state device made of electro-optic material except for coplanar electrodes 12 and 14 and leads. The leads 16 and 18 are bonded to the ends of the electrodes 12 and 14 at the input and output end of the modulator as shown in FIG. 1. The modulator is small. The illustrated modulator has a length of the order of millimeters, suitably 5 millimeters between the input and output ends 20 and 22 thereof. It may be of the order of a millimeter in height and a millimeter in width. The electrodes 12 and 14 are strip lines in the illustrated embodiment which are 100μm wide separated by 20μm.

The electrodes are deposited on a body or substrate 24 of electro-optic materials which has a waveguide 26. The waveguide is defined by layers of materials similar to the rest of the substrate 24 but having a slightly different index of refraction. These layers, in the illustrative embodiment are three layers, namely and uppermost layer 28 which defines one side of the substrate 24, another layer 30 and a third layer 32. These layers are suitably of GaAlAs and are deposited, as by molecular beam epitaxy, on the lower substrate portion 34 which is suitably of GaAs. It has been found that the Ga content of the layers 28 to 32 should be 80 to 90% of the Ga content of the portion 34. The layers may suitably be $Ga_{0.9}Al_{0.1}As$ for the layer 28, $Ga_{0.87}Al_{0.13}As$ for the layer 30, and $Ga_{0.9}Al_{0.1}As$ for the layer 32. The layers 28 and 30 may be submicron in thickness, suitably about a ½μm for the layer 28 and 0.8 μm for the layer 30. The layer 32 may be larger and have a thickness of approximately 3.5 μm.

Another body or cap is disposed on the substrate body 24 and serves as a superstrate. This is a body of GaAs which may be of approximately the same thickness as the lower portion 34 of the substrate 24. This superstrate is identified by the reference numeral 40. It is preferable that the superstrate encompasses the electrodes 14 and 12 so that the dielectric constant around the transmission line is uniform. However, the superstrate 40 may be placed in contact with the strip line electrodes 12 and 14, leaving an air gap between the electrodes and outwardly from the ends thereof to the right and left sides of the modulator 10.

The substrate and particularly the layer 28 is formed with a rib 42 of approximately the same thickness (e.g. about 5,000 ÅA) this rib confines the optical field laterally and also enhanced the uniformity of the dielectric constant in the vicinity of the transmission line. The thickness of the superstrate is approximately the same as the thickness of the lower portion 34 of the line. layers 28,30 and 32 constituting the waveguide 26 is spaced from the input end 20 of the modulator and launches the optical signal into the waveguide. This optical signal is collected by a lens 48. The optical signal may be a polarized signal, for example, from a laser which is passed to a polarizer and a quarter wavelength waveplate. The polarized laser light, may be cw or pulsed in synchronism with the electrical signal which is launched on the transmission line into the input ends of the electrodes 12 and 14. The output modulated signal is passed through the lens and an analyzer. The polarization changes as a function of the electrical modulating signal on the line. The optical signal may be measured by conversion with a photoconverter into an electrical signal. It has been demonstrated that the rise time of the optical signal after modulation by a one picosecond rise time electrical pulse is approximately 3.2 picoseconds which corresponds to a 110 GHz bandwidth for 3 dB rolloff.

From the foregoing description it will be apparent that there has been provided an improved optical modulator in particularly an improved broad band travelling wave optical modulator. Variations and modifications within the scope of the invention will undoubtedly suggest themselves to those skilled in the art. Accordingly the foregoing description should be taken as illustrative and not in a limiting sense.

We claim:

1. An optical modulator operative over a broad band of frequencies so that pulses in the picosecond range are useful as a modulating signal which comprises a substrate of solid state electro-optic material longer in length than in width and having opposite sides, at least one electrode on one of the opposite sides and extending along the length thereof, said substrate defining an optical wave guide for the optical signal to be modulated in said substrate parallel to said electrode, a superstrate of solid state dielectric material parallel to and in contact with said electrode and disposed along said one side, said superstrate, substrate and said electrode defining an electrical transmission line along which said pulses propagate, said line having an effective bulk dielectric constant, the square root of which is substantially equal to the index of refraction of said substrate, said line paralleling said optical wave guide along which said optical and electrical signals can travel, and said optical signal being modulated by said electrical signal.

2. The modulator according to claim 1 wherein said substrate and superstrate have dielectric constants which are substantially equal.

3. The modulator according to claim 1 wherein a pair of electrodes are disposed parallel to and coplanar with each other along the length of said first side.

4. The modulator according to claim 3 wherein said substrate has a rib upstanding between said electrodes.

5. The modulator according to claim 1 wherein said substrate and superstrate encompass said electrode and provide a dielectric constant encompassing said electrode which is substantially uniform.

6. The modulator according to claim 1 wherein said substrate has a plurality of layers therein along said one side which defines said optical waveguide.

7. The modulator according to claim 1 wherein said substrate and said superstrate consist essentially of GaAs.

8. The modulator according to claim 7 wherein said substrate has a plurality of layers of GaAlAs along said first side which define said optical waveguide.

9. The modulator according to claim 8 wherein said GaAlAs layers contain sufficient Ga such that the index of refraction thereof is substantially the same as that of GaAs.

10. The modulator according to claim 9 wherein said electrode has another electrode parallel and coplanar therewith on said one side.

11. The modulator according to claim 10 wherein said bodies are of the order of 100 $\mu$m in width, and half a millimeter in height and millimeters in length.

12. The modulator according to claim 3 wherein said electrodes are of superconducting material having an energy gap of the order of at least hundreds of GHz, and means for operating said modulator at or below the critical temperature of the superconducting material.

* * * * *